US009719557B2

(12) United States Patent
Gauger et al.

(10) Patent No.: US 9,719,557 B2
(45) Date of Patent: Aug. 1, 2017

(54) AXIAL BEARING

(71) Applicant: Bosch Mahle Turbo Systems GmbH & Co. KG, Stuttgart (DE)

(72) Inventors: Stephan Gauger, Esslingen (DE); Fabian Haslinger, Mannheim (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 88 days.

(21) Appl. No.: 14/795,873

(22) Filed: Jul. 9, 2015

(65) Prior Publication Data

US 2016/0010683 A1 Jan. 14, 2016

(30) Foreign Application Priority Data

Jul. 10, 2014 (DE) .................. 10 2014 213 473
Nov. 4, 2014 (DE) .................. 10 2014 222 514

(51) Int. Cl.
*F16C 32/06* (2006.01)
*F16C 17/04* (2006.01)
(Continued)

(52) U.S. Cl.
CPC .......... *F16C 17/047* (2013.01); *F01D 25/168* (2013.01); *F01D 25/18* (2013.01);
(Continued)

(58) Field of Classification Search
CPC .... F16C 17/047; F16C 17/10; F16C 33/1075; F16C 33/125; F16C 2360/24
See application file for complete search history.

(56) References Cited

U.S. PATENT DOCUMENTS 2,731,305 A * 1/1956 Wilcock ............... F16C 17/047
384/307
2,872,256 A 2/1959 Thomson
(Continued)

FOREIGN PATENT DOCUMENTS

DE 19641673 A1 4/1998
DE EP 1998009 A1 * 12/2008 ........... F01D 25/166
(Continued)

OTHER PUBLICATIONS

English abstract for EP-2140114.
(Continued)

*Primary Examiner* — Phillip A Johnson
(74) *Attorney, Agent, or Firm* — Fishman Stewart PLLC

(57) ABSTRACT

A bearing for an exhaust gas turbocharger may include an annular body and a centrally arranged passage opening for bearing a shaft at least one of axially and radially with respect to a rotation axis. The body may include an oil pocket, a wedge surface extending at least partially in a circumferential direction, and a detent surface circumferentially spaced from the oil pocket via the wedge surface. The detent surface may include a predetermined wear height configured to be worn down over an operating lifespan of the bearing. A radially inner flange may extend at least partially along the wedge surface in the circumferential direction and define an inner sealing web. A radially outer flange may extend at least partially along the wedge surface in the circumferential direction and define an outer sealing web.

20 Claims, 3 Drawing Sheets

(51) Int. Cl.
  *F16C 33/10* (2006.01)
  *F01D 25/16* (2006.01)
  *F01D 25/18* (2006.01)
  *F16C 17/10* (2006.01)

(52) U.S. Cl.
  CPC ...... *F16C 33/1075* (2013.01); *F05D 2220/40* (2013.01); *F16C 17/10* (2013.01); *F16C 2360/24* (2013.01)

(56) References Cited

U.S. PATENT DOCUMENTS

| | | | | |
|---|---|---|---|---|
| 3,232,680 | A | * | 2/1966 | Clark ..................... F16C 17/10 384/110 |
| 3,495,886 | A | * | 2/1970 | Roberts ................ F16C 17/042 384/420 |
| 3,512,854 | A | | 5/1970 | Harbage, Jr. |
| 4,326,758 | A | | 4/1982 | Nozue et al. |
| 4,348,065 | A | * | 9/1982 | Yoshioka ........... F16C 33/1075 384/121 |
| 4,383,771 | A | | 5/1983 | Freytag et al. |
| 4,522,513 | A | * | 6/1985 | Nozue .................... F16C 17/18 384/368 |
| 4,639,148 | A | | 1/1987 | Tamura et al. |
| 5,951,169 | A | * | 9/1999 | Oklejas .............. F16C 33/1065 384/123 |
| 5,980,114 | A | * | 11/1999 | Oklejas, Jr. .......... F04D 29/041 384/123 |
| 6,024,495 | A | | 2/2000 | Loos et al. |
| 6,976,788 | B2 | | 12/2005 | Honda et al. |
| 7,832,934 | B2 | | 11/2010 | Hemmi et al. |
| 8,834,029 | B2 | * | 9/2014 | Laubender ............ F16C 17/047 384/121 |
| 2006/0165325 | A1 | * | 7/2006 | Link ..................... F01D 25/168 384/123 |
| 2011/0038716 | A1 | * | 2/2011 | Frankenstein ........ F01D 25/168 415/170.1 |

FOREIGN PATENT DOCUMENTS

| | | |
|---|---|---|
| DE | 102008045229 A1 | 3/2010 |
| EP | 2140114 A2 | 1/2010 |
| JP | 2000186712 A | 7/2000 |
| JP | 2003148456 A | 5/2003 |
| JP | 2003222123 A | 8/2003 |
| WO | WO-2011154078 A1 | 12/2011 |

OTHER PUBLICATIONS

English abstract for JP-2000186712.
German Search Report for DE-102014222514.0, dated Mar. 13, 2015.
German Search Report for DE-102014213473.0, dated Nov. 3, 2014.
English abstract for DE-102008045229-A1.
English abstract for JP 2003222123-A.
English abstract for JP 2003 148456-A.
European Search Report for EP 15174334.1, dated Jan. 20, 2016.

* cited by examiner

AXIAL BEARING

CROSS-REFERENCE TO RELATED APPLICATIONS

This application claims priority to German Patent Application Number 10 2014 213 473.0 filed on Jul. 10, 2014 and German Patent Application Number 10 2014 222 514.0 filed on Nov. 4, 2014, the contents of which are hereby incorporated by reference in their entirety.

TECHNICAL FIELD

The present invention relates to an axial bearing or a combined axial/radial bearing, in particular for an exhaust gas turbocharger, which has substantially a disc-shaped or cylindrical shape. The invention furthermore relates to an exhaust gas turbocharger with at least one such axial bearing or one such combined axial/radial bearing.

BACKGROUND

Due to prospective stricter exhaust gas regulations, measures are being increasingly sought in order to be able to reduce the $CO_2$ emission of internal combustion engines. A current measure for this is the reduction of consumption through downspeeding/downsizing combined with an exhaust gas turbocharging. The exhaust gas turbocharger generally has here a hydrodynamic sliding bearing, which is divided into an axial and radial bearing. In order to be able to further reduce the $CO_2$ emission of turbocharged internal combustion engines, in particular an optimized mounting of a rotor in an exhaust gas turbocharger is helpful.

From WO 2011/154078 A1 a generic axial bearing is known for mounting a rotatable shaft, having a first bearing body which is fixedly connected to a bearing housing and having a second bearing body which rotates with the shaft. Here, the axial bearing has at least one oil pocket, arranged in circumferential direction, a wedge surface adjoining thereto, and a detent/bearing surface in turn adjoining thereto. The actual axial mounting of the rotatable shaft takes place via this wedge surface or respectively the detent/bearing surface by means of a pressure produced in the oil film.

In order to be able to also reduce the $CO_2$ emission of turbocharged internal combustion engines in the long term, it is necessary in particular to be able to guarantee the bearing capacity of the axial bearing or respectively of the combined axial/radial bearing as far as possible over the entire lifespan and hence independent of wear. Through non-optimum ancillary conditions, for example deficient oil lubrication, oil temperatures which are too high or respectively thrust loads which are too high in transient processes, wear can occur to the axial bearing, which leads directly to a significant decrease of the loading capacity and hence of the bearing capacity of the axial bearing or respectively of the combined axial/radial bearing.

SUMMARY

The present invention is therefore concerned with the problem of indicating for an axial bearing or a combined axial/radial bearing of the generic type an improved or at least an alternative type or respectively an improved or at least an alternative embodiment, through which the loading capacity of the axial bearing or respectively of the combined axial/radial bearing can also be guaranteed in the long term, preferably over the entire lifespan.

This problem is solved according to the invention by the subject of the independent claims. Advantageous embodiments are the subject of the dependent claims.

The present invention is based on the general idea of applying a defined wear height onto the axial bearing and here practically onto a detent surface of the axial bearing, and thereby of increasing the lifespan of the axial bearing or respectively of being able to guarantee its loading capacity in the long term. The axial bearing used for this has here in a known manner a disc-shaped or cylindrical shape and a centrally arranged passage opening for a shaft and an oil pocket in the manner of a segment of a circle, and a wedge surface, adjoining thereon, in the manner of a segment of circle, in circumferential direction. Generally, the axial bearing can be constructed here as a pure axial bearing or as a combined axial/radial bearing. In turn, a detent surface adjoins the wedge surface, wherein this detent surface has, according to the invention, an additional wear height which, regarded over the lifespan of the axial bearing, serves as a wear layer and can be worn down. In the case of non-sealed axial bearings, a wear height additionally arranged in such a manner would lead to a drastic reduction of the loading capacity, whereby a defined additional wear height would not actually be productive. For this reason, the axial bearing according to the invention or the combined axial/radial bearing has in addition an inner flange, running in the form of a ring segment, which is constructed as a sealing web and continues uninterruptedly into the detent surface, and an outer flange, running at least in the form of a ring segment, which is likewise constructed as a sealing web. The inner flange and the outer flange bring about the necessary sealing effect here, whereby the loading capacity is not impaired even with the additional wear height. As a whole, with an axial bearing or combined axial/radial bearing constructed in such a manner with a defined wear height and inner and outer sealing web, the lifespan can be distinctly increased. Generally, the provision of the additional wear height according to the invention also enables a slimming down of the axial bearing set, because for example a basic design of the axial bearing without wear height is designed for the maximum occurring thrust within a core assembly, whereas the minimum occurring thrust is covered by the additionally defined wear height. The axial bearing/axial/radial bearing according to the invention therefore optimally conforms to the respective thrust requirements through wear of the additional wear height. With the axial bearing according to the invention therefore preferably all occurring thrust states are able to be covered, so that in the most favourable case only a single axial bearing has to be provided within a core assembly, whereby in particular also the costs for storage and logistics can be distinctly lowered owing to the number of parts.

In an advantageous further development of the solution according to the invention, the wedge surface has a continuous or discontinuous incline in circumferential direction. Through a continuous incline, a continuous pressure build-up is made possible, whilst through a discontinuous incline for example firstly a collecting of lubricant, in particular oil, with a subsequent rapid pressure build-up can be achieved.

Expediently, the inner flange continues, flush with the surface, into the detent surface. The inner flange can, however, also already terminate in front of the detent surface. The inner flange and the detent surface lie, furthermore, preferably in a plane, so that the wedge surface is constructed obliquely to the inner flange and obliquely to the detent surface. A transition between the wedge surface and the inner flange can be embodied here in a rounded manner or by means of a kink.

In a further advantageous embodiment of the solution according to the invention, the axial bearing/axial/radial bearing has at least on the first side three oil pockets, three detent surfaces, three wedge surfaces and three sealing webs. Of course, the same number of oil pockets or respectively detent surfaces and wedge surfaces can also be arranged here on the second side. The oil pockets are arranged here offset with respect to one another by 120° in circumferential direction and in a mirror-inverted manner to the oil pockets on the opposite side of the axial bearing/axial/radial bearing. Of course, also four or more such bearing components (oil pockets, wedge surfaces and detent surfaces) can also be provided here, and the geometric arrangement can be varied.

In a further advantageous embodiment of the solution according to the invention, the axial bearing/axial/radial bearing has a wear height interrupted once or several times (e.g. by grooves or recesses), so that the course of the bearing force of the axial bearing can be influenced even better. Through the grooves, not defined in further detail in their embodiment, the bearing force increases distinctly in the region of the not completely worn wear height, in addition the friction is reduced by the grooves. The axial bearing or the combined axial/radial bearing can therefore cover an even greater range of different bearing forces.

The present invention is additionally based on the general idea of equipping an exhaust gas turbocharger with at least one axial bearing/axial/radial bearing described in the previous paragraphs. Hereby, it is possible to cover all thrust states, i.e. all operating states, with only a single axial bearing design, wherein the maximally occurring thrust in the core assembly is covered by the basic design of the axial bearing without additional wear height, whereas through the defined additional wear height the minimally occurring thrust can be covered within the core assembly. With the axial bearing/axial/radial bearing according to the invention, an optimized mounting of the rotor of the exhaust gas turbocharger can therefore be achieved over the entire lifespan, which leads to a reduced fuel consumption and therefore also to a reduction of the $CO_2$ emission of the internal combustion engine.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown here, respectively diagrammatically.

DETAILED DESCRIPTION

Figure 1:
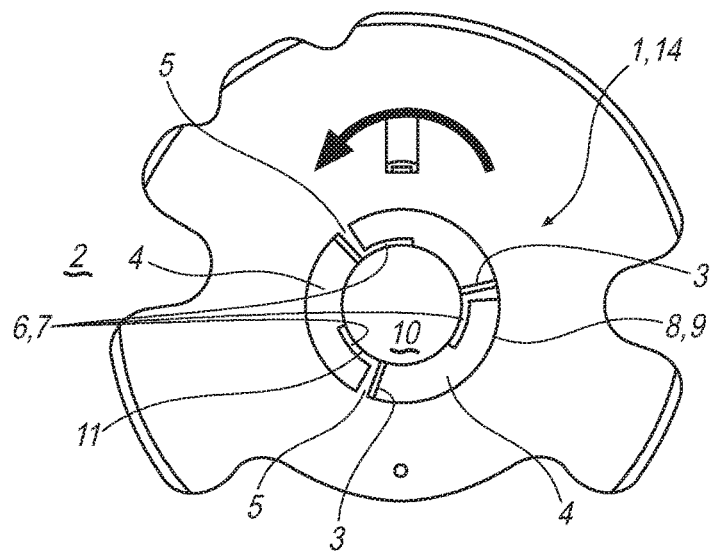
FIG. 1 a view onto an axial bearing/axial/radial bearing according to the invention in an exhaust gas turbocharger, FIG. 2 an oblique view onto the axial bearing/axial/radial bearing according to the invention, FIG. 3 a sectional illustration of the course of the wedge and of the detent surface of an axial bearing according to the prior art, FIG. 4 a sectional illustration as in FIG. 3, but in the case of an axial bearing/axial/radial bearing according to the invention, FIG. 5, 6 further embodiments of the axial bearing/axial/radial bearing according to the invention with a detent surface interrupted by recesses, FIG. 7 a view onto a further embodiment of an axial bearing/axial/radial bearing according to the invention with additional wear layer which is triangular in cross-section, FIG. 8 a sectional illustration along the section plane I-I of FIG. 7, FIG. 9 an illustration as in FIG. 7, but with a rectangular additional wear layer, which is additionally interrupted in radial direction, FIG. 10 a sectional illustration along the section plane II-II of FIG. 9, FIG. 11 a sectional illustration along the section plane III-III of FIG. 9, FIG. 12 a sectional illustration along the section plane III-III of FIG. 9 in an alternative embodiment.
Figure 2:
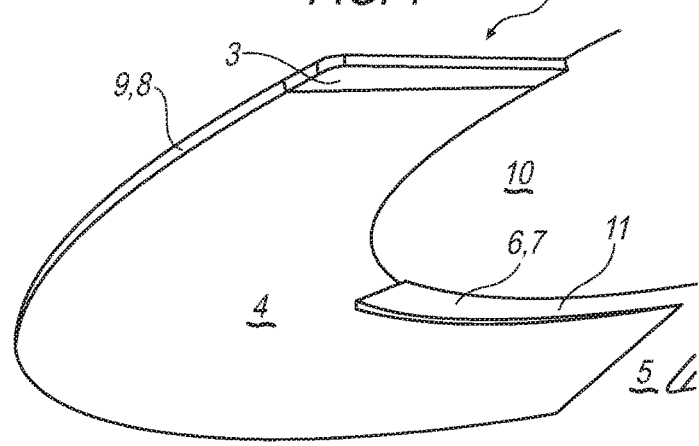
Figure 3:
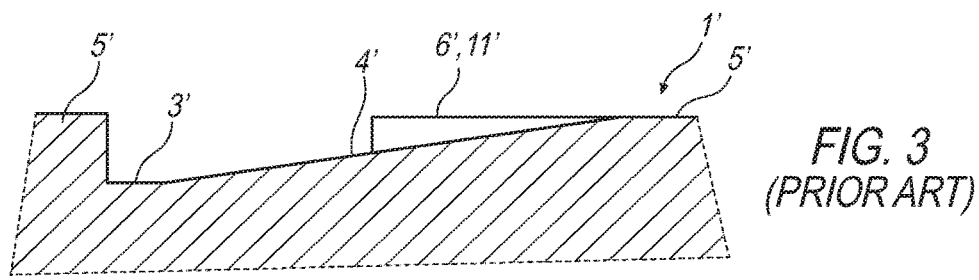

According to FIGS. 1 to 10, an axial bearing 1/axial/radial bearing 14 according to the invention, in particular for an exhaust gas turbocharger 2, has a substantially disc-shaped or cylindrical shape with a first and a second side. Here, the axial bearing 1/axial/radial bearing 14 has, arranged in succession in circumferential direction, an oil pocket 3 in the manner of a segment of a circle, a wedge surface 4 adjoining thereto in the manner of a segment of a circle, and a detent surface 5 adjoining the wedge surface 4.

According to the invention, the detent surface 5 has an additional wear height H (cf. FIG. 4), which can be worn down over the lifespan of the axial bearing 1/axial/radial bearing 14. Often, below, reference is made only to the axial bearing 1, wherein of course it is clear that the comments made with regard to the axial bearing 1 are also able to be applied in an identical manner to the radial/axial bearing 14 according to the invention, which in particular can be constructed in one piece with the axial bearing 1. The axial bearing 1' from the prior art, illustrated according to FIG. 3, does not have this additional wear height. Basically here in FIG. 3 the same elements are designated by the same reference numbers, but additionally with an apostrophe. Furthermore, the axial bearing 1/axial/radial bearing 14 according to the invention has an inner flange 6 running in the form of a ring segment (cf. FIGS. 1 and 2), which is constructed as a sealing web 7. An outer flange 8, running at least in the form of a ring segment, is also provided, which is constructed as a sealing web 9. In axial bearings having no such embodiment of the sealing webs 7, 9, the additional wear height H would lead to a drastic reduction of the loading capacity, whereby in this case this would not be productive. This is different in the axial bearings 1 with inner and outer sealing web 7, 9 according to the invention, because through the sealing effect of the two webs 7, 9 the loading capacity is scarcely influenced by the provided wear height H. Therefore, through the provided wear height H, the lifespan can be distinctly increased.

Figure 4:
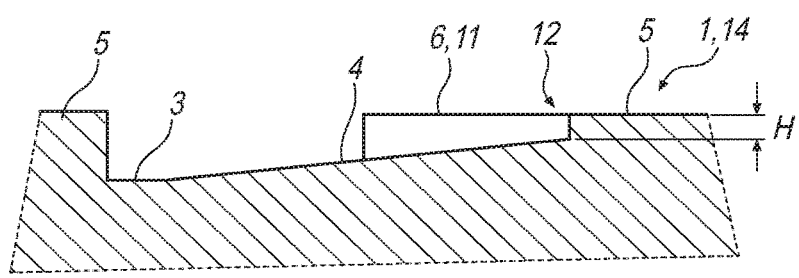

Observing the axial bearing 1/axial/radial bearing 14 according to FIG. 4, it can be seen that the wedge surface 4 continues via a step 12 into the detent surface 5, wherein the step height corresponds to the wear height H. The wear height H can be formed here by a separate wear layer, in particular a friction- or respectively wear-resistant layer, or else it can also be constructed in one piece with the axial bearing 1/combined axial/radial bearing 14, as is illustrated according to FIG. 4.

Observing again the axial bearing 1/axial/radial bearing 14 according to FIG. 1, it can be seen that the inner flange 6 continues preferably uninterruptedly into the detent surface 5 and thereby an undesired oil discharge in the direction of a central passage opening 10, through which the shaft is directed, can be prevented. On the inner flange 6 a sealing surface 11 is arranged, which lies in the same plane as the detent surface 5. The detent surface 5 forms here the actual bearing surface.

The wedge surface 4 can have here a continuous or discontinuous incline in circumferential direction and rises from the lowest point, i.e. from the oil pocket 3 towards the highest point, i.e. the detent surface 5.

All the illustrated embodiments of the axial bearing 1/axial/radial bearing 14 have in common here that the detent surface 5 runs in radial direction and the inner flange 6 continues preferably flush with the surface, into the detent surface 5. The inner flange 6, running in circumferential direction, in turn continues substantially at right angles into the radially running detent surface 5, wherein the inner flange 6, constructed as sealing web 7, enables a smaller pressure drop inwards on the pressure build-up, whereby the loading capacity of the axial bearing 1 can be distinctly increased. The incline of the wedge surface 4 is not established from the outset here, but rather can be selected individually according to the embodiment of the exhaust gas turbocharger 2 and the required bearing characteristics. In the same manner, a sealing surface 11 on the inner flange 6, the oil pocket 3 or respectively the detent surface 5 are also able to be varied as required with regard to their dimensions and are thereby able to be optimized.

As can be seen from the illustrated embodiments of the axial bearing 1/combined axial/radial bearing 14, this has, uniformly distributed in circumferential direction, three oil pockets 3, three detent surfaces 5 and three wedge surfaces 4 and three sealing webs 7 with associated inner flange 6. Of course, also more or fewer (for example one or two) oil pockets 3, detent surfaces 5, wedge surfaces 4, etc. can also be provided here, paired respectively.

Figure 5:
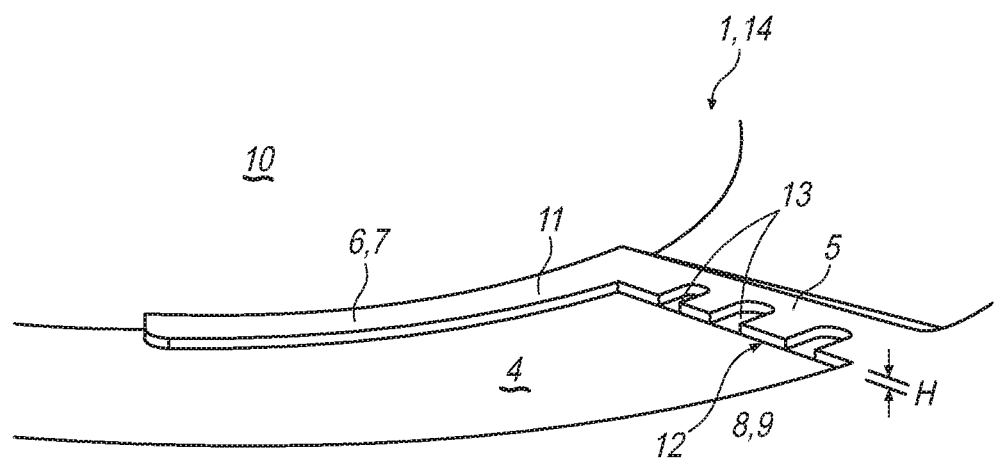
Figure 6:
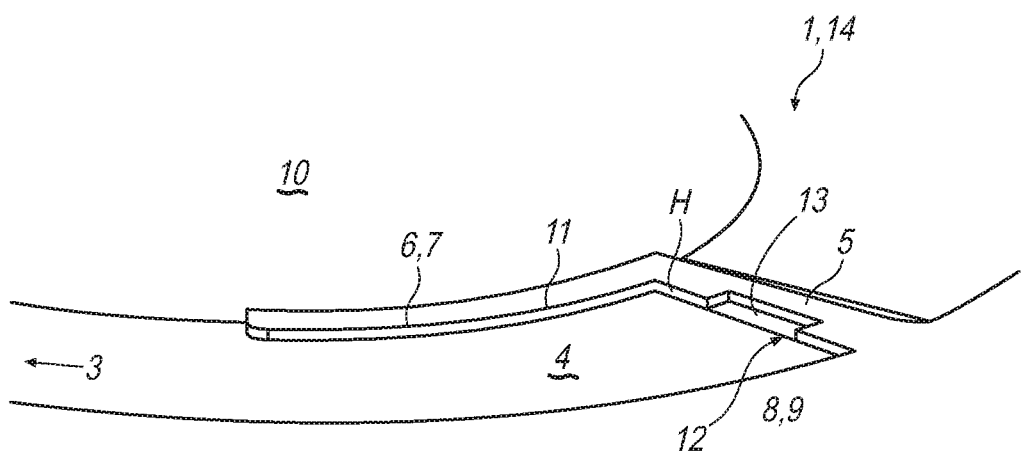

FIG. 5 and FIG. 6 show further embodiments of the axial bearing 1/axial/radial bearing 14 according to the invention with a detent surface 5 interrupted by recesses 13 which are not defined in further detail. Through this embodiment, the extent of the bearing force and its course during the wear process can again be adapted better to particular requirements. Only one recess 13 can be provided here (cf. FIG. 5), or else also several recesses 13 (cf. FIG. 6), wherein the recess(es) 13 can be rounded or constructed in an angled manner.

Of course, it is also conceivable that the axial bearing 1 according to the invention is a component of the combined radial/axial bearing 14. Also, an exhaust gas turbocharger 2 can be equipped with an axial bearing 1 according to the invention and/or with a combined radial/axial bearing with at least one such axial bearing 1.

With an axial bearing 1/axial/radial bearing 14 constructed in such a manner, in particular the multiplicity of parts of an axial bearing set can be distinctly reduced, because all the thrust requirements can be covered with the axial bearing 1/axial/radial bearing 14 according to the invention. The basic design without wear height is designed here for maximally occurring thrust within the core assembly, whereas by the provision of the defined wear height H according to the invention, the minimally occurring thrust of the core assembly can be covered. Through wear height H defined by a wear the axial bearing 1/axial/radial bearing 14 therefore conforms to the respective thrust requirements. Generally, with the additional wear height H also the lifespan of the axial bearing 1 according to the invention can be increased, just as the long-term loading capacity of the axial bearing 1/axial/radial bearing 14. Through the improved mounting, in turn a lowering of the fuel consumption and indirectly therewith also a lowering of the $CO_2$ emission can be achieved.

Observing for example FIGS. 5 and 6, it can be seen that at least the wedge surface 4 shown there and the detent surface 5 shown there touch the inner flange 6 and/or the outer flange 8, i.e. contact these directly. The detent surface 5 in addition continues in an uninterrupted and flush manner into the inner flange 6 and the outer flange 8 and therefore into the two sealing webs 7, 9.

In particular, there is no gap between the detent surface 5 or respectively the wedge surface 4 and the inner flange 6 and/or the outer flange 8. The two sealing webs 7, 9, i.e. the two flanges 6, 8 therefore fulfill not only a sealing function, but also influence the pressure build-up in the region of the wedge surface 4.

Figure 7:
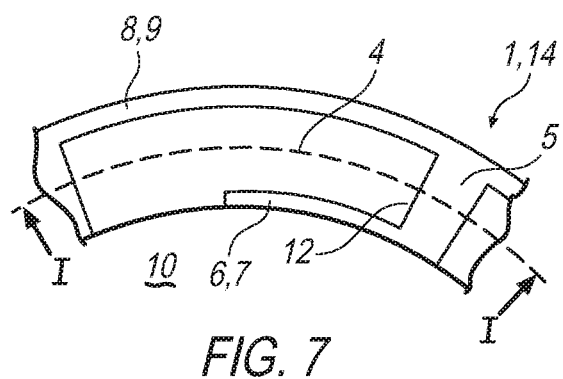
Figure 8:
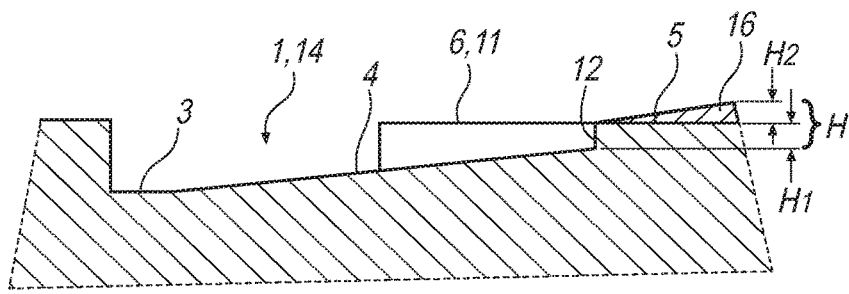

In FIGS. 7 and 8 an embodiment is shown of the axial bearing 1 or of the axial/radial bearing 14, in which the partial wear height $H_1$ is constructed in one piece with the axial bearing 1 or with the axial/radial bearing 14 and additionally at least one separate wear layer 16 with a partial wear height $H_2$ is provided. The entire available wear height H is produced here from a sum of the partial wear heights $H_1$ and $H_2$. Of course, it is also conceivable that also the partial wear height $H_1$ is formed by a separate wear layer 15, as is illustrated for example in FIG. 10.

Figure 10:
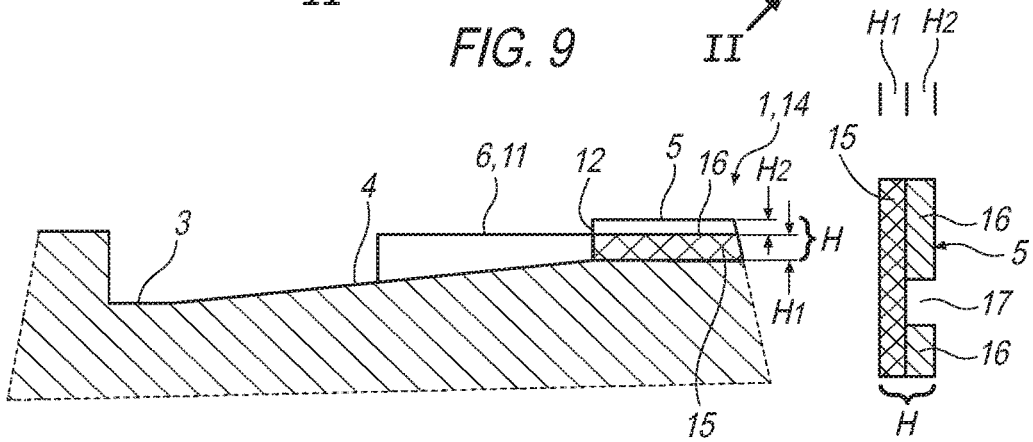

In FIG. 8 the partial wear height $H_1$, formed in one piece with the axial bearing 1 or with the axial/radial bearing 14, is rectangular in cross-section, whereas the at least one separate wear layer 16 is constructed so as to be triangular in cross-section, wherein in the latter case the partial wear height $H_2$ corresponds to the height of the triangular wear layer 16. In FIG. 10 the wear height H is formed by a first separate wear layer 15 with the partial wear height $H_1$ and a second separate wear layer 16 with the partial wear height $H_2$. Both wear layers 15, 16 are rectangular in cross-section here.

Figure 9:
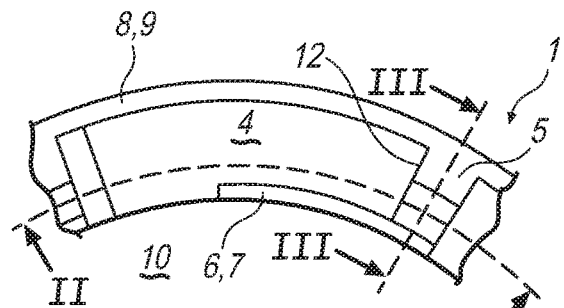
Figure 11:

The separate wear layer 16 of FIGS. 9 to 11 is interrupted in radial direction, i.e. it has an opening 17. This means that the wear height H and the partial wear height $H_2$ vary in radial direction. It is clear here that the wear layers 15 or 16 can also have several openings 17, i.e. are interrupted several times. Also, a combination of a triangular wear layer 16, which is interrupted at least once, with a rectangular wear layer 15 is conceivable. Through the opening 17 a defined reduction of the loss of loading capacity of the axial bearing 1 or respectively of the axial/radial bearing 14 can be brought about.

Figure 12:
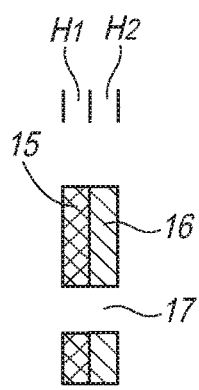

Observing FIG. 12, it can be seen that both wear layers 15, 16 are completely interrupted by the opening 17. In this case, the wedge surface 4 would continue directly into the opening 17. Also, an opening 17, running only partially over the height $H_1$ is conceivable. In this case, the opening 17 would continue over a portion of the wear layer 15 with the height $H_1$ and over the entire wear layer 16 with the height $H_2$.

With the wear layer 15 the lifespan can be increased and an effective protection can be created against overloading. Hereby, the axial bearing 1 or respectively the axial/radial bearing 14 can be optimized with regard to its dimensions. Depending on the selection of the material for the wear layer 15, no loss of loading capacity has to be feared.

Through the triangular wear layer 16 of FIG. 8, a self-integrating variant can be created. Hereby, for example, a slimming down of a set of which the axial bearing 1 or respectively the axial/radial bearing 14 is composed becomes possible.

The invention claimed is:

1. A bearing for an exhaust gas turbocharger, comprising:
   an annular body and a centrally arranged passage opening for bearing a shaft at least one of axially and radially with respect to a rotation axis;
   an oil pocket;
   a wedge surface extending at least partially in a circumferential direction of the body;
   a detent surface circumferentially spaced from the oil pocket via the wedge surface;
   the detent surface including a predetermined wear height in an axial direction configured to be worn down over an operating lifespan of the bearing;
   a radially inner flange extending at least partially along the wedge surface in the circumferential direction, the inner flange defining an inner sealing web;
   a radially outer flange extending at least partially along the wedge surface in the circumferential direction, the outer flange defining an outer sealing web; and
   wherein the wedge surface extends via a step into the detent surface, and the step defines a step height corresponding to the predetermined wear height.

2. The bearing according to claim 1, wherein at least one of:
   the predetermined wear height includes at least one wear layer overlaying the detent surface; and
   the predetermined wear height is structured in one piece the detent surface.

3. The bearing according to claim 2, wherein the detent surface includes the at least one wear layer defining the predetermined wear height, the at least one wear layer defining at least one of a rectangular cross-section and a triangular cross-section.

4. The bearing according to claim 3, wherein the at least one wear layer is interrupted in a radial direction of the rotation axis via an opening.

5. The bearing according to claim 1, wherein the predetermined wear height varies in a radial direction of the rotation axis.

6. The bearing according to claim 1, wherein the inner flange extends uninterrupted into the detent surface.

7. The bearing according to claim 1, wherein the wedge surface has an incline extending at least one of continuous and discontinuous in the circumferential direction.

8. The bearing according to claim 1, wherein the detent surface extends in a radial direction.

9. The bearing according to claim 1, wherein the inner flange extends flush with the wedge surface into the detent surface.

10. The bearing according to claim 1, wherein the inner flange further defines a predetermined wear height configured to be worn down over the operating lifespan.

11. The bearing according to claim 1, wherein the predetermined wear height of the detent surface is interrupted via at least one groove.

12. The bearing according to claim 1, wherein the oil pocket, the wedge surface, the detent surface, the inner sealing web and the outer sealing web are disposed on at least one side of the body, and wherein the at least one side further includes at least one of at least one other oil pocket, at least one other detent surface, at least one other wedge surface, and at least one other inner sealing web.

13. The bearing according to claim 1, wherein at least one of the wedge surface and the detent surface contacts at least one of the inner flange and the outer flange.

14. The bearing according to claim 1, wherein the detent surface extends uninterruptedly and flush into at least one of the inner flange and the outer flange.

15. An exhaust gas turbocharger, comprising: at least one bearing defining a central passage opening for bearing a shaft at least one of axially and radially with respect to a rotation axis, the at least one bearing including at least one segment extending at least partially in the circumferential direction, the at least one segment including:
    an oil pocket defining an oil pocket height in an axial direction;
    a circumferentially extending wedge surface;
    a detent surface circumferentially spaced from the oil pocket via the wedge surface, the detent surface defining a predetermined wear height in the axial direction configured to be worn down over an operating lifespan of the bearing, wherein the wear height is greater than the oil pocket height;
    a radially inner flange at least partially extending along the wedge surface in a circumferential direction, the inner flange defining an inner sealing web; and
    a radially outer flange at least partially extending along the wedge surface in the circumferential direction, the outer flange defining an outer sealing web;
    wherein the wedge surface extends at an incline in the circumferential direction from the oil pocket to the detent surface.

16. The exhaust gas turbocharger according to claim 15, wherein the wedge surface extends via a step into the detent surface, and wherein the step defines a step height corresponding to the wear height.

17. The exhaust gas turbocharger according to claim 15, wherein the wear height of the detent surface is interrupted in the radial direction via an opening.

18. The exhaust gas turbocharger according to claim 15, wherein the wear height varies in the radial direction.

19. The exhaust gas turbocharger according to claim 15, wherein the inner flange further defines a predetermined wear height configured to be worn down over the operating lifespan of the bearing.

20. A bearing for an exhaust gas turbocharger, comprising:
    an annular body and a centrally arranged passage opening for bearing a shaft at least one of axially and radially with respect to a rotation axis;
    an oil pocket;
    a wedge surface extending at least partially along the body in a circumferential direction of the rotation axis;
    a detent surface circumferentially spaced from the oil pocket via the wedge surface, the detent surface including a predetermined wear height in an axial direction of the rotation axis configured to be worn down over a lifespan of operation;
    a radially inner flange extending at least partially along the wedge surface in the circumferential direction, the inner flange defining an inner sealing web; and
    a radially outer flange extending at least partially along the wedge surface in the circumferential direction, the outer flange defining an outer sealing web;

wherein the predetermined wear height varies in a radial direction of the rotation axis.

* * * * *